US007177516B1

(12) United States Patent
Ahn

(10) Patent No.: US 7,177,516 B1

(45) Date of Patent: Feb. 13, 2007

(54) FAR INFRARED TANDEM LOW ENERGY OPTICAL POWER LIMITER DEVICE

(75) Inventor: Byong H. Ahn, Springfield, VA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 07/566,695

(22) Filed: Jul. 31, 1990

(51) Int. Cl.
*G02F 1/01* (2006.01)

(52) U.S. Cl. .................................................. 385/131

(58) Field of Classification Search ................ 350/313, 350/316; 362/346; 351/213; 427/160; 385/131
See application file for complete search history.

(56) References Cited

U.S. PATENT DOCUMENTS 3,267,807 A * 8/1966 Swope et al. ................ 88/112
3,484,722 A * 12/1969 Barker et al. .............. 350/313
3,714,430 A * 1/1973 Finvold et al. ............ 350/316
3,790,250 A * 2/1974 Mitchell et al. ........... 350/313
4,283,113 A * 8/1981 Eden ...................... 350/96.15
4,401,690 A * 8/1983 Greenberg ................. 427/109
4,524,385 A * 6/1985 Billingsley et al. ......... 358/113
4,545,641 A * 10/1985 Sobey ....................... 350/363

* cited by examiner

*Primary Examiner*—Jack Keith
*Assistant Examiner*—Deandra M. Hughes
(74) *Attorney, Agent, or Firm*—Andrew Romero

(57) ABSTRACT

Two embodiments of a multilayered low energy optical power limiter device are disclosed which protect thermal sensors against laser threats in the far infrared spectral region. One limiter device has multiple layers in order from the incoming radiation side an antireflective coating layer, a window substrate layer, a layer of chalcogenide, a germanium substrate layer, a layer of vanadium dioxide ($VO_2$), a window substrate, and an antireflective coating layer. As incoming radiation energy increases, the $VO_2$ layer will heat up and change from an unswitched transmissive state to a switched reflective state. The excessive energy past the switched state is reflected back through the germanium and chalcogenide layer and is absorbed quickly therein so that these layers also heat up quickly and are switched almost simultaneously with the $VO_2$ layer to provide high optical density at a low switching threshold temperature with high damage threshold. The second embodiment further adds a second $VO_2$ layer between the input antireflective coating layer and window substrate layers to reflect high radiation energy immediately.

7 Claims, 2 Drawing Sheets

10A
12A
14
16
18
12B
10B
6A
6B

FAR INFRARED TANDEM LOW ENERGY OPTICAL POWER LIMITER DEVICE

The invention described herein may be manufactured, used, and licensed by the U.S. Government for governmental purposes without the payment of any royalties thereon.

BACKGROUND OF INVENTION

1. Field

The present invention relates to an optical power limiter device for protecting thermal sensors against threat incoming radiation, and especially to providing a plurality of optical power limiters in tandem between window substrates with each limiter having a progressively lower switching threshold temperature to the incoming radiation so that the last limiter is usually the first to switch on by increasing temperature and reflect back the radiation for a second pass through the other limiters and quickly raise their temperatures to threshold level in which the tandem of limiters essentially switch on sequentially to provide increase in optical density for the device.

2. Prior Art

It is highly desirable to protect sensitive thermal sensors against threat laser radiation which disables the performance of the sensors by jamming or damaging components. Some of the requirements for optical power limiter device are that it be passive and self-activated, broadband between say 7 um to 12 um, a field of view of more than 20°, low thermal switching threshold, large optical density in the switched state, and highly transmissive in the unswitched state.

Devices exist that meet some of these requirements. For example, a chalcogenide optical power limiter or a vanadium dioxide ($VO_2$) optical power limiter used separately can meet some of these requirements, but not all of them. The chalcogenide device has a higher switching threshold, a lower damage threshold, and a lower transmission than the requirements. The $VO_2$ device has a low switching threshold, but also has the undesirable low damage threshold and low transmission. Germanium optical power limiters undergo thermal runaway starting at about 75° C. where the absorption coefficient increases rapidly.

Combinations of the above noted optical power limiter materials as in the present device results in an acceptable device with increased damage threshold, improved switching threshold, and improved optical density which protect the sensors and other optical components more effectively.

SUMMARY OF THE INVENTION

The spirit of the present invention is presented in two separate embodiments, but it is understood that the scope of the invention is not limited to these embodiments. The first embodiment is comprised of the following in order, an input antireflective coating layer, an input window substrate layer, a plurality of layered optical power limiters, namely layers of chalcogenide, germanium and $VO_2$ having progressively lower switching threshold temperatures, an output window substrate layer, and an output antireflective coating layer. The second embodiment is the same as the first embodiment but has an extra layer of $VO_2$ deposited between the input antireflective coating and input window substrate layers.

Operationally, when the first embodiment receives a low amount of input radiant energy through the input antireflective coating and input window substrate layers all of the plurality of optical power limiters absorb the energy and have a rise in temperature. The $VO_2$ layer limiter is switched on first at the lowest self-activated temperature causing reflection of any subsequent input energy back to the germanium layer limiter for further absorption therein and if enough subsequent input energy is passed back through the germanium layer limiter it undergoes thermal runaway, i.e. is switched on, at a temperature only slightly more than the switching threshold temperature of the $VO_2$ layer limiter. The remainder of the input energy reflected from the $VO_2$ layer limiter after the germanium layer limiter is switched is further absorbed by the chalcogenide layer limiter which may be switched so that all of said plurality of optical power limiters are essentially switched on sequentially. If the input energy is greater than in the last illustration the higher switching threshold temperature chalcogenide layer limiter will self activate first and absorb the input energy and protect the germanium and $VO_2$ limiters.

The second embodiment is a slight variation of the first embodiment and is comprised of adding a second layer of $VO_2$ to the first embodiment between the input antireflective coating layer and the input window layer. Operationally, the second layer of $VO_2$ limiter will heat up very quickly with higher input energy and will switch on to reflect the subsequent higher input energy before the input energy even gets to the input window. The purpose of this embodiment is to limit the energy to the remainder of the downstream optical power limiters when a higher input radiation than what is required for the switching of the chalcogenide layer limiter enters the device. Another advantage of the second embodiment over the first is that at a high threat radiation level, the radiation is reflected rather than absorbed thereby protecting the device.

The exact thicknesses of each of the layers is dictated by the transmission and the thermal properties required of each of the layers individually. Some of the requirements are that the total transmission in the unswitched state of the device exceed a certin value, the switching threshold be low enough to be useful, and concept of the multilayered device be effective to limit the threat radiation transmitted through the device. The materials used for the input and output window substrates are preferably zinc selenide or germanium at a thickness on the order of one millimeter or less determined by the structural strength required for the fabrication and the handling of the device. The thickness of the plurality of optical power limiter layers are less than 50 um for the chalcogenide layer, less than 100 um for the germanium layer, and less than 5 um for the $VO_2$ layer.

The damage threshold of the device is improved by the window material being made of zinc selenide or germanium since these materials have higher damage thresholds than the $VO_2$. The damage threshold of the device may be further improved by putting a diamond-like carbon coating layer on the window layers. The germanium optical power limiter between the chalcogenide and $VO_2$ layers has the added advantage that it may facilitate their bonding.

DETAILED DESCRIPTION OF THE PREFERRED EMBODIMENTS

Figure 1A:
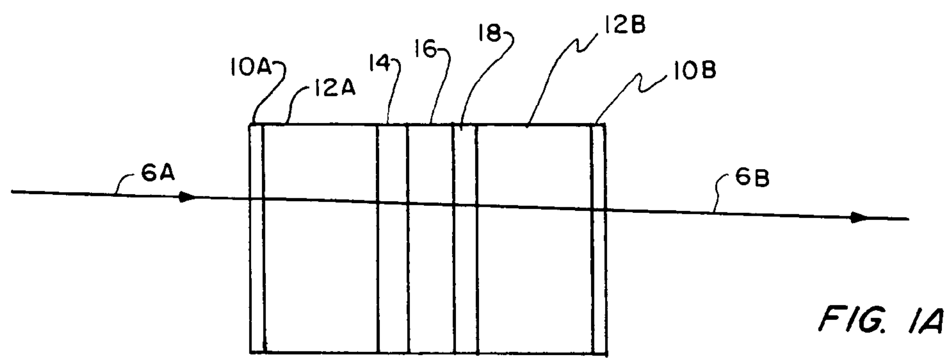
FIGS. 1A through 1D illustrate schematically the switching sequence of the first embodiment.

Refer to FIGS. 1A through 1D for an explanation of one embodiment of the device. FIG. 1A illustrates the device in the unswitched highly transmissive state where the output radiation energy 6B is generally more than 80% of the input radiation energy 6A as long as 6A is below a threshold level. That is, as long as 6A is below the threshold level, the plurality of tandem optical power limiter layers 14, 16, and 18 will not increase in temperature to the self-activated state, i.e. switch on from the transmissive to either the reflective or absorptive states. An input antireflective coating layer 10A and input window substrate layer 12A are on the input side of the chalcogenide layer 14, the germanium layer 16, and the $VO_2$ layer 18. At the output of layer 18 are the output window substrate layer 12B and output antireflective coating layer 10B.

Figure 1B:
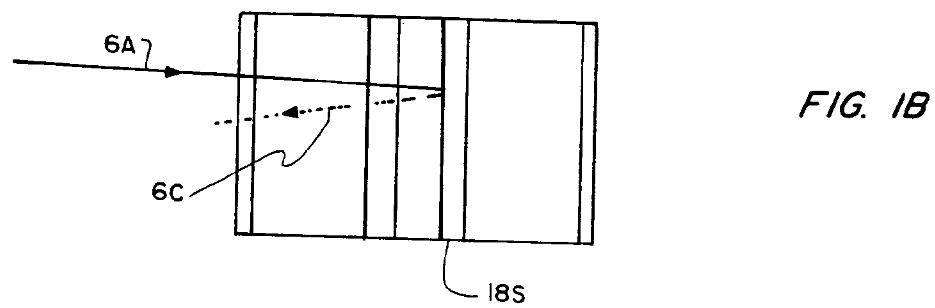
Figure 1C:
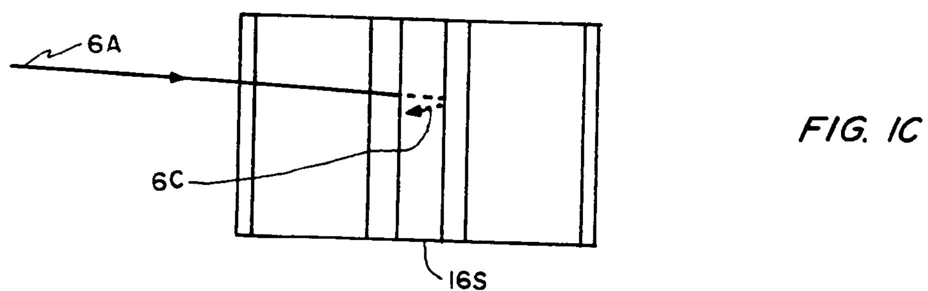
Figure 1D:
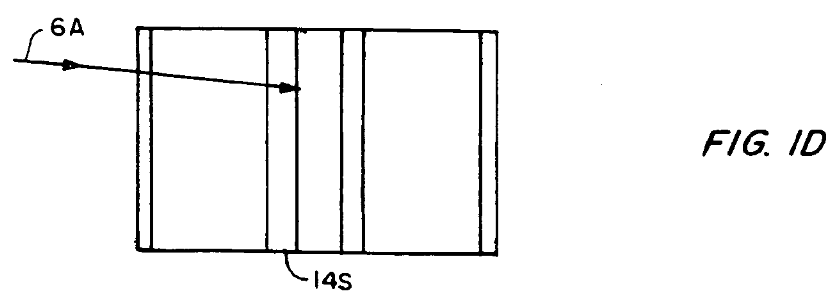

FIG. 1B illustrates schematically what happens when the input radiation energy, perhaps from an adversary intending to damage the thermal sensors, is increased above the threshold level. Number 18S is used to indicate that the $VO_2$ layer 18 is now in a switched condition caused by absorption of the higher input energy and increase of temperature to 68° C. The input energy 6A is reflected back from 18S as reflected energy 6C through layers 16, 14, 12A, and 10A instantaneously. Meanwhile, FIG. 1C illustrates that the germanium layer 16 has absorbed the reflected energy from 18S and (U) instantaneously undergoes thermal runaway at 75° C. and is switched on as represented by 16S. FIG. 1D illustrates the situation when the chalcogenide layer 14 has also instantaneously switched on as represented by 14S by the radiation and thermal energy reflected back from layer 16S. At this time all three of the plurality of layers 18S, 16S, and 14S are in the switched condition which has drastically increased the optical density of the device, has increased the damage threshold of the device at least to the higher level of the chalcogenide layer 18, and has switched the device on at the lowest switching threshold of the $VO_2$ layer 18.

Figure 2A:
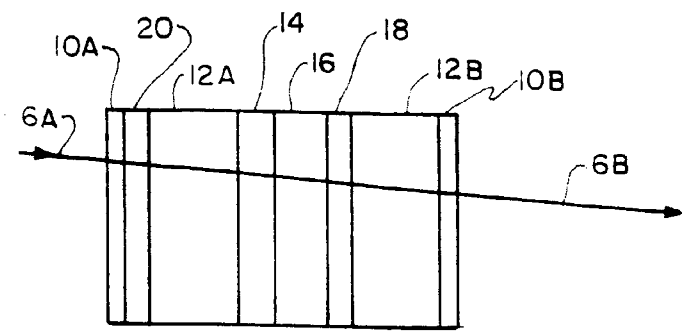
FIGS. 2A through 2E illustrate schematically the second embodiment.

Refer now to FIGS. 2A through 2E for an explanation of the second embodiment of the device. FIG. 2A illustrates the device in the unswitched high transmissive state where 6B is still more than 80% of 6A as in the first embodiment. A second layer of $VO_2$, represented by 20, is however placed between 10A and 12A. At the lower input energy levels the second embodiment will function the same as the first embodiment. That is, the switching on of all layers 18, 16, and 14 to fully increase the optical density of the device as controlled by the plurality of optical limiter layers could have actually been partially switched if the input energy was slightly above the threshold level. Stated another way, only 14 and 16 may have switched. The adding of a second layer of $VO_2$ between 10A and 12A is to protect the thermal sensors at higher input radiation energy than was required to switch on the chalcogenide layer 14S in the above illustration where all three 18S, 16S, and 14S were self-activated. This assumes that the input radiation is focused on $VO_2$ layer 18 and is thus more wide spread on $VO_2$ layer 20.

Figure 2B:
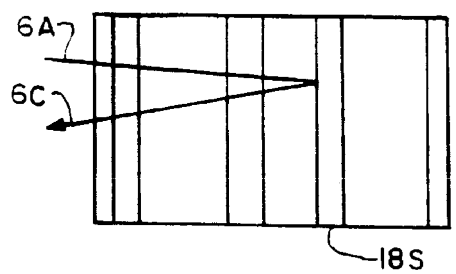
Figure 2C:
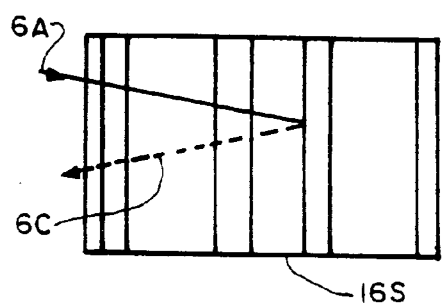
Figure 2D:
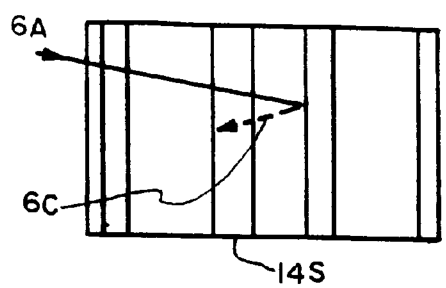
Figure 2E:
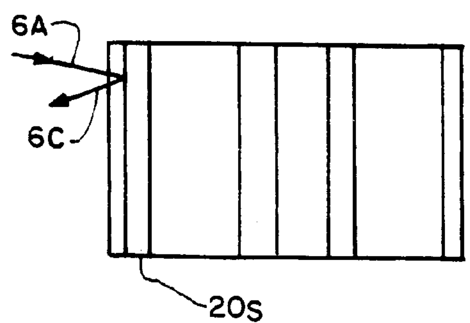

FIGS. 2B, 2C, and 2D illustrate respectively the switching of 18S into a reflective state and 16S and 14S into absorptive states. FIG. 2E illustrates what could happen by placing the second layer of $VO_2$ between 10A and 12A when a still higher input radiation energy 6A enters the device. The second $VO_2$ layer 20 will self-activate first into the switched state 20S. Layer 20S will immediately reflect the incoming radiation 6A back as reflected radiation 6C and will reflect subsequent radiation to protect the downstream plurality of optical power limiter layers 14, 16, and 18. Advantages to using the second embodiment is that the device itself is protected from damage when operated in a high threat laser radiation environment. That is, damaging radiation is reflected away from the device immediately rather than absorbed in layers 18, 16, and 14 or the other layers.

Modifications and variations of the present invention are possible in light of the above teachings. It is therefore to be understood that within the scope of the appended claims the invention may be practiced otherwise than as specifically described.

I claim:

1. A low energy optical power limiter device for protecting thermal sensors against input threat laser radiation intended to disable the performance of said sensors in the far infrared spectrum, said limiter comprised of:

a multilayered optical power limiter device comprised of a plurality of optical power limiter layers of various thicknesses having progressively lower switching threshold temperatures damage thresholds from an input radiation side to an output side of said device and further having high transmissivity below an energy threshold of incoming radiation, said plurality of optical power limiter layers positioned between an input window substrate layer having an input antireflection coating layer thereon and an output window substrate layer having an output antireflection coating layer thereon wherein the optical power limiter layer contiguous with said output window substrate layer has the lowest damage threshold and switching threshold temperature and is first switched on by said threat laser radiation to become reflective from the highly transmissive state in which said threat radiation is progressively reflected back through the remainder of said plurality of optical power limiter layers for a second pass of said threat laser radiation therethrough wherein the temperatures in each of said layers quickly build up by radiation absorption and switch on all of said plurality of optical power limiter layers essentially instantaneously to provide large optical density in the switched state at a low switching threshold representative of said optical power limiter layer contiguous with said output window wherein said plurality of optical power limiter layers has a high damage threshold representative of said optical power limiter layer contiguous with said input window substrate layer.

2. A device as set forth in claim 1 wherein said plurality of optical power limiter layers is three in line from said input window substrate layer comprising a chalcogenide layer having a switching threshold temperature of 150° C., a germanium layer having a switching threshold temperature of 75° C., and a vanadium dioxide layer having a switching threshold temperature of 68° C. wherein said vanadium dioxide layer absorbs said threat laser radiation which raises its temperature above 68° C. and is self activated and switched on to change from transmissive to reflective and reflects subsequent threat laser radiation back to said germanium layer which absorbs both the subsequent incoming and reflected threat laser radiation which raises its temperature to 75° C. and undergoes thermal runaway with the remainder of said reflected threat laser radiation absorbed by said chalcogenide layer which raises its temperature to 150° C. resulting in all of said plurality of optical power limiter layers essentially switched on instantaneously wherein said device maintains the low switching threshold of said vanadium dioxide layer and wherein the optical power density is increased by the essential switching of all three optical power limiters instantaneously at the low switching threshold of said vanadium dioxide layer and wherein the damage threshold of said device is increased to that of said chalcogenide layer damage threshold since threat laser radiation is progressively and quickly reflected away from the lower damage thresholds of said vanadium dioxide layer and said germanium layer.

3. A device as set forth in claim 2 wherein said input and output window substrate layers are made of zinc selenide of about 1 millimeter thickness.

4. A device as set forth in claim 3 wherein input and output antireflective coating layers are made of diamond-like carbon.

5. A device as set forth in claim 4 wherein the thickness of each of said chalcogenide layer, said germanium layer, and said vanadium dioxide layer are chosen for desired transmission and thermal properties of each of said layers.

6. A device as set forth in claim 5 herein said chalcogenide layer is less than 50 um, said germanium layer is less than 100 um, and said vanadium dioxide layer is less than sum.

7. A device as set forth in claim 1 wherein a second optical power limiter layer of the same material as said layer having the lowest damage threshold and switching threshold temperature contiguous with said output window substrate is deposited between said input antireflective coating layer and said input window substrate layer, wherein said second of said lowest damage threshold and switching threshold temperature optical power limiter layers switches first upon self-activation thereof by input threat laser radiation and reflects said threat laser radiation from said device before it enters said input window substrate layer to protect said plurality of optical power limiter layers.

* * * * *